United States Patent [19]
Barreto et al.

[11] Patent Number: 6,136,082
[45] Date of Patent: Oct. 24, 2000

[54] PROCESS FOR THE PREPARATION OF DENSE BITUMINOUS MIXES WITH EMULSION, AND EMULSION FOR ACHIEVING SAME

[75] Inventors: Gilles Barreto, Paris; Lionel Grampre, Pontoise; Luc Navascues, Paris, all of France

[73] Assignee: CECA S.A., Puteaux, France

[21] Appl. No.: 09/131,362

[22] Filed: Aug. 7, 1998

[30] Foreign Application Priority Data

Aug. 13, 1997 [FR] France .................................. 97 10337

[51] Int. Cl.⁷ .................................................. C09D 195/00
[52] U.S. Cl. ............................................................ 106/277
[58] Field of Search ............................................. 106/277

[56] References Cited

U.S. PATENT DOCUMENTS 5,443,632  8/1995  Schilling ................................. 106/277
5,597,409  1/1997  Ito et al. ................................. 106/671

FOREIGN PATENT DOCUMENTS

| 0 775 982 A2 | 5/1997 | European Pat. Off. . |
| 0 775 982 A3 | 5/1997 | European Pat. Off. . |
| 2 695 664 | 3/1994 | France . |
| 2 273 110 | 2/1996 | France . |
| 96/41839 | 12/1996 | WIPO . |

*Primary Examiner*—David Brunsman
*Attorney, Agent, or Firm*—Smith Gambrell & Russell, L.L.P.

[57] ABSTRACT

Coating is carried out with the aid of an emulsion which consists of the mixture of a fast-breaking emulsion and a slow-breaking emulsion. It is advantageous to take a soft bitumen emulsion as fast emulsion and a hard bitumen emulsion as slow emulsion.

14 Claims, No Drawings

PROCESS FOR THE PREPARATION OF DENSE BITUMINOUS MIXES WITH EMULSION, AND EMULSION FOR ACHIEVING SAME

FIELD OF THE INVENTION

The present invention relates to an improvement to the manufacture of road construction materials by coating granulates with the aid of bituminous emulsions.

BACKGROUND OF THE INVENTION

For a long time bituminous emulsions have been prepared by cold coating of granulates with the aid of bituminous emulsions. In this application, cationic emulsions have been particularly valued, both for the speed of the breaking of the emulsion on the granulates, which in the case of the bituminous mix eliminates the risk of a separation due to spontaneous draining of the binder which is still emulsified, and for the adhesiveness properties of the bituminous mix, which rapidly protects the structures produced with these materials from washing out on the first occurrence of bad weather.

The factors to guard against in the production of a bituminous material by coating a size-graded composition with a bituminous emulsion are well known to a person skilled in the art:

during the coating an excessively fast destabilization of the emulsion on contact with the granulates, which has the effect of a poor final distribution of the binder;

during the conveying of the bituminous mix, an excessive sensitivity of the bituminous mix to temperature, to evaporation and to vibrations, which has the effect of making it difficult to unload and to make its placing in position or its compacting difficult or even impossible.

Among the simple remedies, the increase in the water content during the coating allows a better distribution of the binder within the granulate. The converse side is the slowness of breaking of the emulsion on coating, or even overstabilization, which results in the loss of unbroken emulsion and the outflow of dirty liquors during conveying and the risk of the bituminous mix being delivered on site in the form of "soup", and hence severe difficulties in order to remove the excess water on compacting and to obtain a large increase in cohesion. The additional risk is that with excessively long periods between the coating and the delivery on site, the bituminous mix is delivered on site solidified in the tipper, deprived of handleability when unloading, when being spread and finished and when being rolled.

The use of a soft bituminous binder very certainly improves the handleability of the bituminous mix, but at the cost of a low and unacceptable mechanical strength of the structure. In all cases the behaviour of the bituminous mix is very dependent on its water content, the working range of the water content is very narrow and, furthermore, poorly controllable.

The less open the bituminous mix manufactured, the more these features are accentuated, and improvements are still to be expected for the manufacture of bituminous mixes, especially of cold dense bituminous mixes. (Cold dense bituminous mixes are intended to mean the systems in which the granular fraction comprises a 2 mm sieve undersize of at least 25% and an 80 $\mu$m sieve undersize of at least 5% of its total mass.)

Insofar as the handleability factor of the bituminous mix is concerned, an appreciable improvement has been obtained, described in French patent No. 92 10908 (publication FR 2 695 664), which consists in producing a bituminous mix with a binder of given hardness, with an emulsion containing two bitumens in the dispersed state, one hard, the other soft, in proportions such that their mixture has the desired final hardness. The handleability when being placed in position is facilitated by the soft bitumen, whereas the final quality of the structure is attained by the formation in position of a binder of desired hardness by fusion of the droplets of hard bitumen with those of soft bitumen. However, this process does not provide a solution to the control of the speed of breaking of the emulsion and hence of the physicochemical change in the granulate/emulsion system between the coater and the compacting roller.

DESCRIPTION OF THE INVENTION

The intention is to obtain a dense bituminous mix which, on leaving the mixer, has a black and dry granular appearance, sufficiently broken up not to settle, nor to drain, but retaining its handleability and capable of developing its cohesion when placed in position under the effect of the powerful shearing by the compactor. According to the invention this result is attained by coating the granulates with a mixed bituminous emulsion consisting of the mixture of a fast-breaking emulsion and of a slow-breaking emulsion.

For the characterization of the reactivity of coating emulsions, the method of the breaking index on siliceous filler gives results that are not very significant, or are even contrary to the behaviour on breaking during the coating of materials on site. For this reason we characterize the breaking behaviour of an emulsion differently. Within the meaning of the present invention a slow-breaking emulsion is intended to mean cationic or nonionic emulsions which give rise to breakings which are not very extensive, or even overstabilizations on site granular formulation over times of between 25 minutes and 4 hours in the case of added-water contents (counted in relation to the mass of the granulates stored under site conditions) of between 1% and 15%; the breaking is deemed not to be very significant when the washing out carries away most (50% or more) of the emulsion or of the mastic. A fast-breaking emulsion, on the other hand, is intended to mean cationic emulsions which give rise to considerable breakings on site granular formulation over short periods of between 20 seconds and 5 minutes in the case of added-water contents of between 1% and 15%; the breaking is deemed considerable when the washing out leaves the mastic in place (less than 25% of the emulsion is washed out).

It is quite astonishing that, by employing the mixture according to the invention of a slow-breaking emulsion and of a fast-breaking emulsion, coating qualities are obtained which are vastly superior to that which would be obtained with the emulsion of the same overall composition produced with the aqueous phase alone consisting of the mixture of the aqueous phases of the individual emulsions. The interpretation which can perhaps be applied to this difference is that, if the aqueous phases of the mixed emulsions form a uniform aqueous phase, the droplets of bitumens would each retain the complement of the emulsifying molecules borrowed from the aqueous phase in which they have been manufactured and hence would retain their own coalescence properties.

The emulsifiers which can be employed for the manufacture of the slow-breaking emulsions (slow emulsifiers) are: tallow polyamines and more particularly tallow polypropylenepolyamines like tallow propylenediamine (EINECS definition: amines, N-tallow alkyltrimethylenedi-, RN=61791-55-7), tallow dipropylenetriamine (amines, N-tallow alkyldipropylenetri-, RN=61791-57-9), tallow tripropylenetetramine (amines, N-tallow alkyltripropylenetetra-, RN=68911-79-5, the latter being industrially well represented by Polyram® S from CECA S.A.) and quaternary ammonium salts like tallow propylenediamine quaternized with methyl chloride (compound of the quaternary ammonium ion, pentamethyltallow alkyltrimethylenedi-, chloride, RN=68607-29-4) well represented by Stabiram® MS3 from CECA S.A., and alkoxylated derivatives of fatty alcohols like, for example, ethoxylated fatty alcohols with a fatty chain with a number of carbons from 12 to 22 and a number of ethylene oxides from 5 to 40.

Emulsifiers which can be employed for the manufacture of the fast-breaking emulsions (fast emulsifiers) are tallow or tall oil alkylamidoamines, their alkylimidazoline cyclization derivatives or their mixtures (mixtures of $C_{8-22}$ fatty acids, products of reaction with $C_{2-3}$ polyalkylenepolyamines and ethanolamines, RN=84082-48-4 and $C_{8-22}$ amides N-[3-(dimethylamino)propyl], RN=84082-43-9), well represented by the emulsifier L60 from CECA S.A.

In order to gain in handleability of the bituminous mix while preserving its ability to develop a high final cohesion, it is advantageous to manufacture the fast-breaking emulsion from a soft bitumen and the slow-breaking emulsion from hard bitumen. The fast-breaking emulsion will then be manufactured from a bitumen with a penetration of 80 to 500 and the slow-breaking emulsion from a bitumen with a penetration of 20 to 180/220. It is to be understood that the choice of what is called a hard bitumen or soft bitumen is relative, the rules for this being the known ones of composition of the viscosities of binder mixtures to obtain the desired viscosity of the bitumen which will result from the final mixing of the two component binders in the bituminous mix. These rules are recalled in French patent No. 92 10908, already cited.

The bituminous mixes which are produced with the aid of these emulsions, and more particularly the dense bituminous mixes, exhibit the advantages of the two emulsions employed for their manufacture, namely excellent properties for coating, for handling in repairs and the first placing in position, and high final cohesions. They do not possess their disadvantages because they create hardly any difficulty in tamping under the compactor, and their behaviour shows very little sensitivity to the water content, both of added water and water intrinsic in the granulates. This is a considerable advantage on site, where the amount of water in a granulate is a random quantity which varies according to the state of its removal from the quarry and of its storage in inclement weather.

The emulsions according to the invention will also be highly valued for surface dressing work (single-layer and twin-layer with emulsion) for their suitability for rapidly forming the mosaic.

EXAMPLES

In the examples which follow the granulates are quartzites of 0–10 particle size. The bitumens are Esso 35/50 and 180/220.

Mixed emulsions were prepared according to the procedure specified in FR 92 10908, which consists in preparing the base individual emulsions with a hard or soft binder content of 65% (650 kg per tonne of emulsion) and aqueous phases acidified with hydrochloric acid so as to make their pH 2, the mixed emulsions being formed by mixing individual emulsions of hard and soft bitumen in a proportion of 65%–35% so as to make the average binder correspond to a bitumen of penetrability 70. The bituminous mixes are produced with a binder content of 5.5%.

Example 1: Slow Mixed Emulsions According to the Prior Art

Two emulsions are produced, one of 35/50 bitumen, the other of 180/220 bitumen, each with a tallow tripropylenetetramine (Polyram® S) content of 4 kg per tonne of emulsion. The mixed emulsion is the emulsion produced by mixing 65% of the hard bitumen emulsion with 35% of the soft bitumen emulsion.

The coating is performed in a model SRC5 Consulting SR planetary mixer. The variable explored is the quantity of water added to the granulate. The procedure is as follows: after pouring the granulates into the planetary mixer, mixing for a period of 30 seconds is performed. The added water is then poured in. This added quantity is 4%, 5%, 6%, 7% and 8% relative to the mass of the granulates stored at 20° C. without moisture control. A new mixing is performed for 30 seconds before adding the emulsion. Mixing is again carried out for 30 seconds with all the components of the final system.

The compacting method is compacting using the Rotary Shearing Press (model Invelop Oy ICT-100RB). On leaving the mixer the bituminous mix is placed in the PCG mould (cylindrical mould 100 mm in diameter and 25 cm in height), where it is stored for 15 minutes before compacting. The test pieces, once formed at 6 bars, 120 rotations, are demoulded and left to age at 20° C. without moisture control for 1 h, 4 h or 16 h before being broken: the test piece is placed in simple compression between the jaws of an Instron 4482 fracture bench. The rate of deformation is set at 50 m/min. The change in the force of reaction of the test piece is followed during the deformation: the maximum reaction corresponds to the load at break.

The results are given in Table I.1: quality of the coating, washing out (expressed as percentage of bitumen recovered by washing out 1 min after the end of coating), final torque measured during the PCG experiment, final apparent density after PCG, expressed as void ratio at 130 revolutions, appearance of the breaking water. Table I.2 shows the loads at break on the test pieces manufactured with the PCG ("-" means that the test piece crumbled before breaking).

TABLE I.1

| Added-water content | Coating | Washing out | Final torque (N m) | Void ratio (%) | Breaking water |
|---|---|---|---|---|---|
| 4 % | good | 70 % | 274 | 8.3 | dirty |
| 5 % | good | 70 % | 289 | 8.4 | dirty |
| 6 % | soup | 90 % | 275 | 9.5 | dirty |
| 7 % | soup | 90 % | 227 | 8.7 | dirty |
| 8 % | soup | 90 % | 234 | 6 | dirty |

TABLE I.2

| Added-water content | 1 h aging | 4 h aging | 16 h aging |
|---|---|---|---|
| 4 % | 4.6 | 3.7 | 6.9 |
| 5 % | 3.8 | 3.7 | 3.9 |
| 6 % | 2.9 | 2.6 | 2 |
| 7 % | 1.4 | — | 0.7 |
| 8 % | 2.2 | 1.1 | 2.4 |
| av. | 3 | 2.8 | 3.2 |

The coating is complete in all cases. With 4% and 5% of added water the appearance of the bituminous mix is "greasy" and the breaking water is laden with emulsion. The breaking is partial, at 30%. From 6% of added water onwards, the bituminous mix gives a soup and there is overstabilization. The breaking water is highly laden with emulsion and the breaking applies to only 10% of the emulsion. To obtain a better behaviour it would be necessary to work with water contents that are too low, taking into account the intrinsic water content of the granulates. This bad behaviour on coating is accompanied by a high dependence of the mechanical behaviour on the added water. The final torque decreases with the water content. The loads at break fluctuate and are sometimes nonexistent when a test piece which is too brittle (although compressed at 6 bars) has not been successfully demoulded. Such a system is unsuitable for producing a bituminous mix.

Example 2: Fast-breaking Mixed Emulsions According to the Prior Art

Two emulsions are produced, one of 35/50 bitumen, the other of 180/220 bitumen, each with a tallow alkylamidoamine (emulsifier L60 from CECA S.A.) content of 4 kg per tonne of emulsion. All the other conditions are those of Example 1.

The results are reported in Table II.1: quality of the coating, washing out (expressed as percentage of bitumen recovered by washing out 1 min after the end of coating), final torque measured during the PCG experiment, final apparent density after PCG expressed as void ratio at 120 revolutions, appearance of the breaking water. Table II.2 shows the loads at break on the test pieces manufactured with the PCG.

TABLE II.1

| Added-water content | Coating | Washing out | Final torque (N m) | Void ratio (%) | Breaking water |
|---|---|---|---|---|---|
| 4 % | partial | 5 % | 297 | 8.2 | clear |
| 5 % | partial | 5 % | 307 | 7 | clear |
| 6 % | partial | 5 % | 306 | 8.2 | clear |
| 7 % | partial | 5 % | 306 | 8.1 | clear |
| 8 % | partial | 5 % | 310 | 8.2 | clear |
| 10 % | partial | 5 % | 301 | 7.3 | clear |
| 12 % | partial | 5 % | 306 | 7.6 | clear |

TABLE II.2

| Added-water content | 1 h aging | 4 h aging | 16 h aging |
|---|---|---|---|
| 4 % | — | 4.4 | — |
| 5 % | — | 5.4 | — |
| 6 % | 3.8 | 5 | 5.9 |
| 7 % | 5.4 | 5.6 | 6.3 |
| 8 % | 5 | 6.2 | 7.1 |
| 10 % | 4.5 | — | 7.5 |
| 12 % | 4.9 | — | 7.1 |
| av. | 4.7 | 5.3 | 6.8 |

Although the loads at break are higher than in Example 1, this system is not suitable, because of the excessively high reactivity of the emulsions based on alkylamidoamines and alkylimidazolines, which results in only partial coating.

Example 3: Mixed Emulsions According to the Invention

Two emulsions are produced, one of 35/50 bitumen, with a Polyram® S content of 4 kg per tonne of emulsion, the other of 180/220 bitumen, with an L60 emulsifier content also of 4 kg per tonne of emulsion. The mixed emulsion is the emulsion produced by mixing 65% of the hard bitumen emulsion containing Polyram® S with 35% of the soft bitumen emulsion containing L60 emulsifier.

The results are reported in Table III.1: quality of the coating, washing out (expressed as percentage of bitumen recovered by washing out 1 minute after the end of the coating), final torque measured during the PCG experiment, final apparent density after PCG, expressed as void ratio at 120 revolutions, appearance of the breaking water. Table III.2 shows the loads at break on the test pieces manufactured with the PCG.

TABLE III.1

| Added-water content | Coating | Washing out | Final torque (N m) | Void ratio (%) | Breaking water |
|---|---|---|---|---|---|
| 4 % | good | 5 % | 293 | 7.5 | clear |
| 5 % | good | 5 % | 296 | 7.1 | clear |
| 6 % | good | 5 % | 293 | 8.3 | clear |
| 7 % | good | 5 % | 280 | 7 | clear |
| 8 % | good | 10 % | 282 | 8.4 | clear |

TABLE III.2

| Added-water content | 1 h aging | 4 h aging | 16 h aging |
|---|---|---|---|
| 4 % | 3.9 | 6.9 | 8.5 |
| 5 % | 5.3 | 6.8 | 9.1 |
| 6 % | 4.2 | 7 | 8.1 |
| 7 % | 6.6 | 7 | 10.2 |
| 8 % | 5.9 | 7 | 8.4 |
| av. | 5.2 | 6.9 | 8.9 |

The coating is complete and here depends much less on the added-water content. The washing out removes only very little emulsion in all cases. This insensitivity to the added-water content also applies to the mechanical behaviour of the bituminous mix when it is placed in position, which can be seen via the final torque obtained during the PCG experiment. The mechanical strengths obtained are excellent and are associated with void ratios that are lower than in the preceding two examples.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process for the production of dense bituminous mixes comprising coating granulates with bituminous emulsion, the emulsion consists of the mixture of two emulsions,
   one of the emulsions being produced with a cationic or nonionic emulsifier supplying slow-breaking emulsions,
   the other emulsion being produced with a cationic emulsifier supplying fast-breaking emulsions, fast emulsion.

2. Process according to claim 1, wherein the slow emulsion is a cationic or nonionic emulsion of a bituminous binder of penetrability of 20 to 180/220.

3. Process according to claim 1, wherein the fast emulsion is a cationic emulsion of a bituminous binder of penetrability of 80 to 500.

4. Process according to claim 1 wherein the dense bituminous mix produced has a residual binder content on site granular formulation of 3.5% to 5%.

5. Process according to claim 1, wherein the slow emulsifier is a tallow polyamine.

6. The process according to claim 5 wherein the tallow polyamine is selected from the group consisiting of tallow propylenediamine, tallow dipropylenetriamine, and tallow tripropylenetetramine.

7. Process according to claim 1, wherein the slow emulsifier is a quaternary ammonium salt.

8. Process according to claim 7, wherein the salt is tallow propylenediamine quaternized with methyl chloride.

9. Process according to claim 1, wherein the slow emulsifier is an alkoxylated derivative of fatty alcohol.

10. Process according to claim 9, wherein the alcohol is an ethoxylated fatty alcohol with a fatty chain with a number of carbons from 12 to 22 and a number of ethylene oxides from 5 to 40.

11. Process according to claim 1, wherein the fast emulsifier is a tallow or tall oil alkylamidoamine or an alkylimidazoline cyclization derivative thereof.

12. Bitumen emulsion consisting of the mixture of two emulsions, one of the emulsions, cationic or nonionic, having been produced with an emulsifier supplying slow-breaking emulsions, the other emulsion, cationic, having been produced with an emulsifier supplying fast-breaking emulsions.

13. Bitumen emulsion according to claim 12, wherein the slow emulsion is an emulsion of a bitumen of penetrability of 20 to 180/220 and the fast emulsion is an emulsion of bitumen of penetrability of 80 to 500.

14. Bitumen emulsion according to claim 12, consisting of the mixture of an emulsion of a bituminous binder of penetrability of 20 to 180/220, produced with the aid of a tallow polypropylene polyamine as slow emulsifier and of an emulsion of a bituminous binder of penetrability of 80 to 500, produced with the aid of tallow or of tall oil alkylamidoamine or of their mixture with their cyclization alkylimidazoline derivatives as fast emulsifier.

* * * * *

UNITED STATES PATENT AND TRADEMARK OFFICE
CERTIFICATE OF CORRECTION

PATENT NO. : 6,136,082
DATED : October 24, 2000
INVENTOR(S) : Barreto, et al.

It is certified that error appears in the above-identified patent and that said Letters Patent is hereby corrected as shown below:

Col. 4, Line 33: Delete the term [m/min], and insert the term -- mm/min--.

Signed and Sealed this

First Day of May, 2001

Attest:

NICHOLAS P. GODICI

*Attesting Officer*     *Acting Director of the United States Patent and Trademark Office*